Jan. 24, 1928.

W. K. BROWNLEE 1,657,106

REPLACEABLE FLOATING BRIDGE PART FOR GLASS FURNACES

Filed July 15, 1927

Inventor
William K. Brownlee.
By Faust F. Crampton
Attorney

Patented Jan. 24, 1928.

1,657,106

UNITED STATES PATENT OFFICE.

WILLIAM K. BROWNLEE, OF TOLEDO, OHIO.

REPLACEABLE FLOATING BRIDGE PART FOR GLASS FURNACES.

Application filed July 15, 1927. Serial No. 205,913.

My invention has for its object to provide a means for eliminating the erosion caused by the movement of melted glass as it moves from that portion of the furnace where the glass batch is melted and to that portion of the furnace from which it is drawn in the manufacture of the glass articles. Heretofore many schemes have been followed and various constructions have been made to prevent the eating away of bridge walls which are located in glass furnaces to prevent the movement of the glass from the part of the furnace in which the batch is melted to the part of the furnace from which the glass is drawn in the manufacture of the glass articles until the specific gravity of the glass is increased sufficiently to remove the seeds. Cooling chambers have been introduced in the bridge wall, which, however, increases the erosion by reason of the fact that it increases the convection in the glass body directly at the surface of the bridge wall, with the result that instead of reducing the erosion, it has caused an increase in the erosion. By my invention I provide a floating part that may be placed on the surface of the heated glass and which has a width sufficient to remove the current or flow from the surface of the bridge wall and thus prevent the erosion of the bridge wall by the movement of the glass. Where the furnace is of considerable width at the bridge wall, two or more blocks may be positioned so that they will float on the surface of the glass at the bridge wall and on the side of the bridge wall where the glass it heated.

The invention may be contained in glass furnaces of different forms and to illustrate a practical application of the invention, I have shown, in conventional form, a furnace having the usual bridge wall construction, in connection with which replaceable protective blocks are used.

Figure 1:
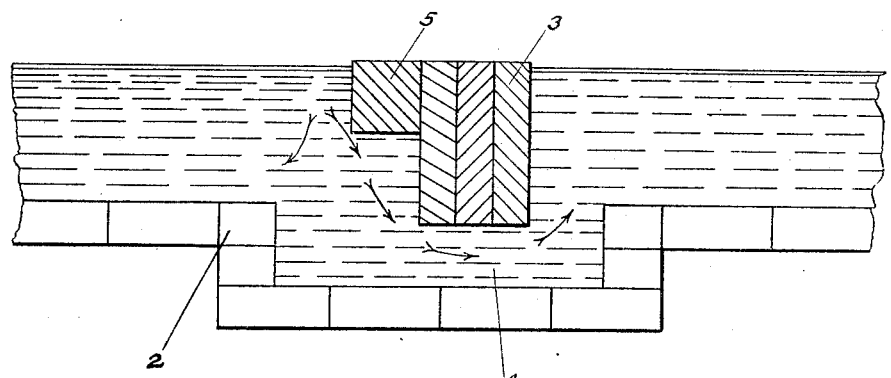
Figure 2:
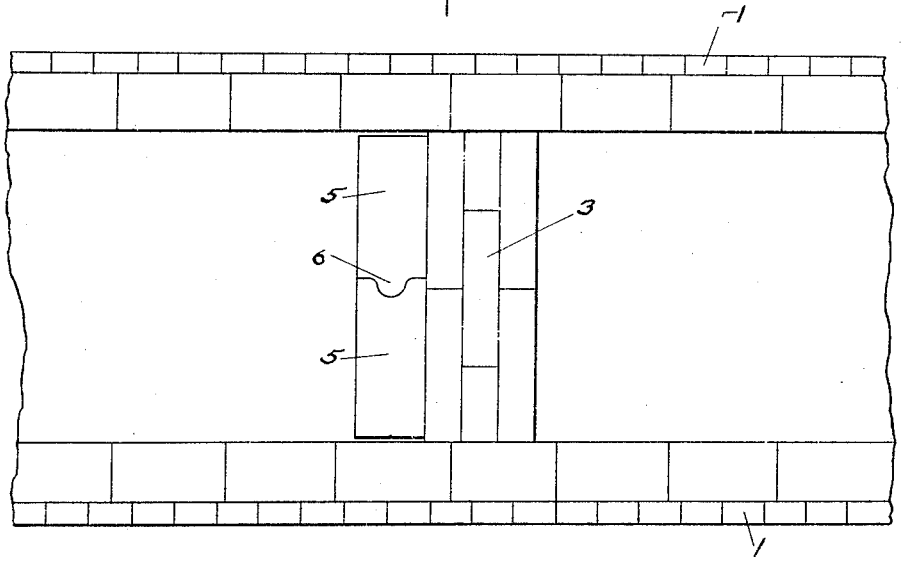

Fig. 1 illustrates a view of the longitudinal section through a part of the furnace and through the bridge wall. Fig. 2 is a plan view of the part of the furnace shown in Fig. 1 and shows the bridge wall and floating blocks located in juxtaposed relation to the bridge wall.

In the figures, 1 indicates the side wall of the furnace, 2 indicates the bottom of the furnace and 3 indicates the bridge wall. These parts may be of the usual construction. The bridge wall 3 is so constructed as to leave an opening or passage-way located intermediate the bottom of furnace and the bridge wall so as to permit the glass having the greater specific gravity to pass beneath the bridge wall from that part of the furnace where the glass is melted and is retained by the bridge wall until all the seeds have been removed by the heat of the burners located in the walls of the furnace. The glass descends and passes into the part of the furnace from which the glass is withdrawn in making the glass articles. The outlet or passage-way 4 being located beneath the bridge wall, only glass of higher specific gravity will pass to that portion of the furnace to which the glass is withdrawn. This movement of the glass towards the bridge wall and downward on the side where the glass is heated, ordinarily causes the bridge wall to be eaten away because of the chemical reactions that take place between the fluxes of the fired clay of which the bridge wall is formed and the glass. This chemical action is greatly increased by the movement of the glass over the surface of the bridge wall. Also, the convection produced by the heat of the burners which is directed towards the surface of the glass increases this erosion. By my invention I provide a replaceable floating bridge that may be formed of one or more blocks located in proximity to or substantially in contact with that side of the bridge wall on which the glass is heated. The blocks 5 are located so that they will float on the surface of the glass and in close proximity to the bridge wall. The blocks 5 have a width so as to displace the convection currents of the glass away from the surface of the bridge wall and also the moving glass that passes beneath the bridge 3 away from the side of the bridge where the glass is heated. This prevents the moving glass from causing erosion of the surface of the bridge wall and hence greatly increases the life of the furnace and the lengths of the possible runs that may be made in the furnace.

If desired the blocks 5 may be suitably dovetailed at their ends as at 6.

I claim:

1. In a glass furnace having a fixed bridge wall, a floating block of refractory material located in juxtaposed relation to the face of the bridge wall and having a width to prevent movement of the glass over the face of the bridge wall.

2. In a glass furnace having a fixed bridge wall, a plurality of floating blocks of refractory material located in juxtaposed relation to the face of the bridge wall and having a width to prevent movement of the glass over the face of the bridge wall.

3. In a glass furnace having a fixed bridge wall, a plurality of floating blocks of refractory material having interfitting end portions located in juxtaposed relation to the face of the bridge wall and having a width to prevent movement of the glass over the face of the bridge wall.

In witness whereof I have hereunto signed my name to this specification.

WM. K. BROWNLEE.